United States Patent [19]
Field

[11] Patent Number: 5,020,620
[45] Date of Patent: Jun. 4, 1991

[54] OFFSETTING THE COURSE OF A LASER GUIDED VEHICLE

[75] Inventor: Bruce F. Field, Golden Valley, Minn.

[73] Assignee: Tennant Company, Minneapolis, Minn.

[21] Appl. No.: 413,631

[22] Filed: Sep. 28, 1989

[51] Int. Cl.$^5$ .............................................. B62D 1/28
[52] U.S. Cl. .................... 180/169; 250/221; 318/587; 356/141; 364/424.02
[58] Field of Search .................. 180/167, 168, 169; 318/587; 356/141; 364/424.02; 250/221

[56] References Cited

U.S. PATENT DOCUMENTS

| | | | |
|---|---|---|---|
| 3,744,586 | 7/1973 | Leinauer | 180/169 |
| 4,225,226 | 9/1980 | Davidson et al. | 356/141 |
| 4,790,402 | 12/1988 | Field et al. | 180/169 |
| 4,846,297 | 7/1989 | Field et al. | 180/169 |
| 4,855,915 | 8/1989 | Dallaire | 364/424.02 |
| 4,918,607 | 4/1990 | Wible | 180/169 |

Primary Examiner—David M. Mitchell
Attorney, Agent, or Firm—Kinzer, Plyer, Dorn, McEachran & Jambor

[57] ABSTRACT

This is an improved apparatus and method for guiding an automated guided vehicle, particularly a floor maintenance machine. This invention discloses electronic means which permit guiding the vehicle toward a point that is laterally offset a desired distance from a retroreflective target, generally in front of the machine, by reference to that target. A series of targets may be sequentially referenced in this manner. A floor area of extended width relative to the width of the machine can be treated by causing the machine to traverse the floor area in a series of passes from one end of the area to the other. The machine is guided during each pass by reference to each one in turn of a series of retroreflective targets located generally ahead of it, and maintains a selected lateral offset from each target. Changing the offset distance during successive passes allows treatment of the area while guiding off a single series of targets.

11 Claims, 1 Drawing Sheet

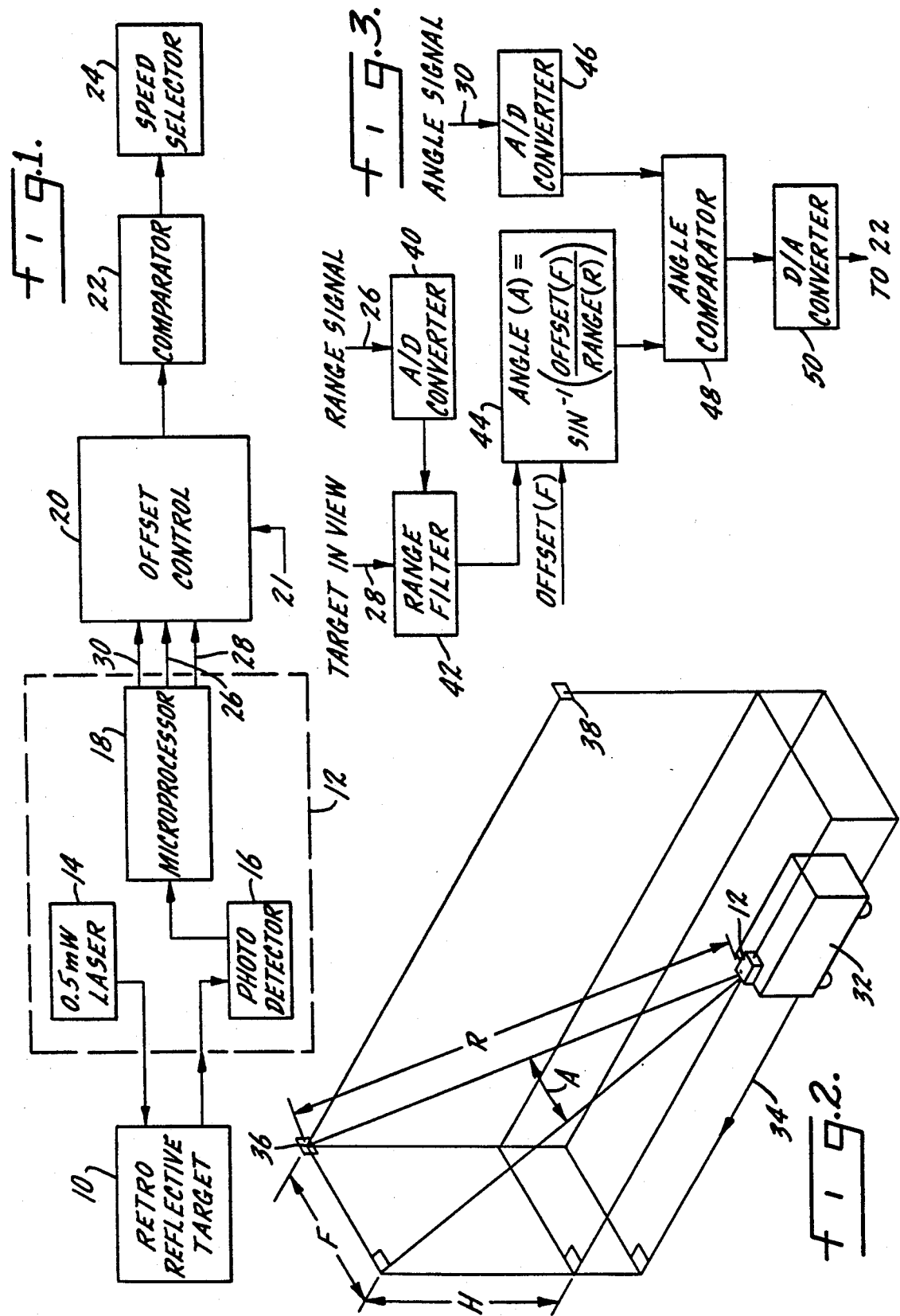

OFFSETTING THE COURSE OF A LASER GUIDED VEHICLE

BACKGROUND OF THE INVENTION

There is a current trend toward the use of a laser beam to provide guidance for certain vehicles, thereby eliminating the need for an attendant to guide them. Such a system is described in U.S. Pat. No. 4,790,402, which is owned by the assignee of the present invention.

U.S. Pat. No. 4,790,402 describes a vehicle on which is mounted a laser unit. This transmits a scanning beam which is reflected sequentially by each of a series of retroreflective targets mounted ahead of the vehicle along the desired pathway. The reflected beam returns to the laser unit on the vehicle and provides a course corrective signal by means of which the vehicle is caused to steer directly toward the target which is reflecting the beam. When the vehicle has nearly arrived at that target, the laser is caused to search out the next target ahead of the machine along the desired track and lock onto it. The vehicle is then caused to steer directly toward that target, and so on, until the intended pathway is completed.

With some types of vehicles it is advantageous to travel repeated parallel paths. For example, a floor maintenance machine such as a sweeper or scrubber is routinely driven along parallel paths, each of which is offset from its neighbor by a little less than the width of the machine. In this way an entire floor area may be cleaned. This is sometimes referred to as "region filling". The machine of U.S. Pat. No. 4,790,402 is a floor maintenance machine, and would be expected to operate on such parallel pathways. Its guidance system will keep the laser unit on the machine headed directly toward the next target. There is provision to move the laser unit from side to side on the machine, so one trip can be made with most of the machine to the left of the line of targets and the next trip can be made with most of the machine to the right of the line or vice versa. In this way an area nearly as wide as two widths of the machine can be cleaned by referring to one line of targets. If wider areas are to be cleaned, one or more additional lines of targets must be installed.

SUMMARY OF THE INVENTION

The improved guidance system and method of this invention guides the machine by reference to a retroreflective target generally ahead of it, but toward a point which may be laterally offset to one side of the target. The offset distance is selectively programmed into the machine, and, by successively changing the offset a substantial area can be cleaned by referring to each target in a series of targets. Sequential reference in turn to each target in the series will allow the full width and length of most building corridors to be cleaned with only one series of targets.

The automated guided vehicle with which this invention is concerned can utilize a laser scanner such as model LN1×0-30000–40000 sold by Namco Controls of Mentor, Ohio, under their trademark Lasernet ®. A detailed description of such a laser scanner is given in U.S. Pat. No. 4,788,441. Such a unit sweeps a 90 degree scan 20 times per second, and within that 90 degree scan it provides a 0–10 VDC analog output for measuring the angle of the reflected beam from the target to the reference line of the transmitter. This reference line is in the center of the 90 degree scan, and the laser scanner is mounted on the vehicle so that its scanning reference line coincides with the vertical plane of the longitudinal centerline of the vehicle. Thus, except when a track is chosen that is laterally offset from the reference target, a five volt output indicates a target directly in front of the laser unit and the vehicle on which it is mounted, while lower voltages indicate a target on one side of the vehicle and higher voltages indicate a target on the other side.

Although the invention will be described in connection with the Lasernet ® laser scanner, the invention should not be so limited and the specific voltages described as the output of that laser scanner are only for purposes of illustration. A laser scanner having either an analog output or a digital output, as described herein, may be satisfactory.

As disclosed in U.S. Pat. No. 4,790,402, the analog output signal of angle measurement is used to produce steering corrections that will keep the vehicle headed directly toward the target that is reflecting the laser beam. Thus, a five volt angle signal would produce zero steering correction, since the machine would already be heading toward the target. Voltages of more or less than five volts indicate that the machine is not heading toward the target, and are used to provide appropriate steering corrections to make it do so.

In the present invention the automated vehicle is capable of following a course that is generally toward a selected target, but is not aimed directly at that target. Rather, the vehicle follows a line toward a point of tangency with an imaginary vertical cylinder centered on the selected target. The radius of the cylinder is equal to the desired offset of the vehicle from the target. In this situation the machine does not point toward each target in turn, but rather it passes alongside each one, bypassing them by a specified distance. This offset guidance is accomplished with no lateral movement of the laser unit on the vehicle. It is done entirely with electronic circuitry.

When traveling on such an offset course the angle from the target to the reference line will be constantly changing. This might be compared to a person driving an automobile on a straight road with a row of telephone poles along the road but off to one side. In the driver's field of view, a pole far ahead will appear to be at a small angle with the center stripe of the road, but as the car travels forward, the pole will appear to be at a greater and greater angle from the center stripe. At the same time the distance from the car to the pole will be constantly decreasing.

The problem is how to provide a steady voltage reading to give zero steering correction when the automated vehicle is "going straight down the road" although the scanning laser is outputting a continually changing voltage corresponding to the increasing angle to the target.

The laser unit used in this invention provides another voltage output in addition to its analog angle output. It has an analog voltage output on the order of 0–10 VDC that is proportional to the range or distance from the laser unit to the target. This output, though available, was not utilized in the invention of U.S. Pat. No. 4,790,402. The present invention does utilize it. As the vehicle "travels down the road", it comes closer and closer to the target, and the analog range voltage becomes less and less.

A preferred embodiment of the system for controlling vehicle steering utilizes a digital control. The outputs from the laser scanner, if not in digital form, can be converted by suitable analog to digital converters. The range signal from the laser unit is continuously supplied to a computer which has been programmed with the desired offset, and the computer computes from them a continuously changing signal representing the desired angle. This desired angle signal is compared with the continuously changing actual angle signal as provided by the laser scanner. If they are not equal at any time, then the requisite signal for a course correction is provided to the vehicle steering control, which will alter the vehicle heading until the actual angle signal becomes equal to the desired angle signal. This will maintain the machine on a course which is laterally offset a desired distance from each reference target. An extended course may be travelled in this offset mode if a series of targets are provided, and each one is referenced in turn.

It is possible by use of a computer to program the vehicle to sequentially follow a series of parallel paths having different preselected offsets, as the region filling work being done by the vehicle may require. It is also possible to program short segments of travel in which the vehicle is offset to one side or the other in greater or lesser degree. Thus, one can program the vehicle to steer around fixed obstacles in its way.

BRIEF DESCRIPTION OF THE DRAWINGS

FIG. 1 is a block diagram of the control circuit for offsetting the course of a laser guided vehicle.

FIG. 2 is a diagrammatic illustration showing the invention applied to a vehicle moving on a course that is laterally offset from a retroreflective target mounted above the vehicle and generally ahead of it.

FIG. 3 is a block diagram of the offset control.

DETAILED DESCRIPTION OF THE INVENTION

As indicated above, U.S. Pat. No. 4,790,402 discloses an automatic guided vehicle with many of the control elements of the present invention. That patent is hereby incorporated by reference and the present control system will only be described up to the speed selector which is used to maintain the guided vehicle on track. The implementation of the speed selector circuit so that it maintains the vehicle on track is the same as disclosed in the '402 patent.

In FIG. 1, a retroreflective target is indicated at 10 and is in view of a laser scanner 12 which includes a laser light source 14 producing on the order of 0.5 milliwatts of coherent light. The laser light source may be a gas-filled device such as a helium neon laser. Or increased range may be obtained from a diode laser source as described U.S. patent application Ser. No. 374,478, filed June 30, 1989 (now U.S. Pat. No. 4,967,064), and assigned to the present assignee, the disclosure of which is incorporated herein by reference. The light source is incident on a rotating mirror. The rotating mirror directs the output beam in a lateral sweep through the front aperture of the housing. This sweep defines a scanning plane. The front aperture of the housing permits a 45 degree scanning angle on either side of a reference line normal to the face of the housing.

The laser scanner includes a receiving means in the form of a photodetector 16, with the output signal from the photodetector being sent to a microprocessor 18 which provides, either in analog or digital form, signals indicative of the angle to the target 30, the range to the target 26, and whether or not the target is actually in view 28. The photodetector is preferably a phototransistor.

The outputs from microprocessor 18 are connected to an offset control 20, which will be described hereinafter. The offset control 20 has an input 21 representing the desired offset of the vehicle's course from the targets to be used, as shown at "F" in FIG. 2. This input may be from a computer which has been programmed to control the offset of each movement of the sweeper, or from a manual device such as a keypad.

The output from the offset control is a voltage in which a nominal output of five volts indicates that the vehicle is in its assigned path, whereas a voltage less than or greater than the nominal midrange of five volts indicates that course correction is required. Comparator 22 receives the voltage from offset control 20 indicative of the path of the vehicle and compares this voltage against a precise, predetermined five volt reference voltage. If the two voltages are equal, no course correction is required and no output signal is sent to speed selector 24. If the two voltages are not equal, a course correction is required, so a signal is sent to the speed selector 24, which then makes the course correction as described in the '402 patent.

In FIG. 2, a vehicle 32 has a laser scanner 12 and moves along a direction of travel indicated at 34. The targets to control the vehicle path are indicated at 36 and 38. It will be understood that while only two targets are shown, in actual practice there may be a multiplicity of retroreflective targets placed in a row or line. It will also be understood that only one target is in use at any one time. The offset between the direction of travel of vehicle 32 and the target currently in use is designated at "F"; the range or distance to the operational target is indicated at "R"; and the angle as viewed by laser scanner 12 in the scanning plane between the sighted target and the vertical plane containing the longitudinal centerline of the vehicle and its direction of travel is indicated at "A". The height of the operational target above the horizontal plane of the laser scanner is indicated at "H". However, "H" is not needed in the calculations, and the height of the targets is not critical.

FIG. 3 illustrates a digital form of the offset control 20. The range signal input to the offset control from the laser scanner 12 is indicated at 26; the target-in-view signal is indicated at 28; and the angle signal is indicated at 30. The range signal 26 is connected through an analog to digital converter 40, if needed, and a suitable filter 42, to a microprocessor 44. The angle signal 30 from laser scanner 12 is connected through an analog to digital converter 46, if needed, to an angle comparator 48. If the laser scanner has digital outputs as well as or in place of analog outputs, the A/D converters 40 and 46 are not required. They are only necessary when the laser scanner has no digital output port.

The range signal 26 and target-in-view signal 28 are connected to a range filter 42. This is because there are brief intervals when the laser beam leaves one target and searches for the next target. During these intervals the range signal peaks to a maximum, causing spikes in the range signal. The target-in-view signal picks up the intermittent losses of targets and controls the range filter to suppress the spikes which are not truly indicative of range.

As described in connection with FIG. 2, a vehicle on a course which is at a particular desired offset distance "F" from a reference target such as 36 in FIG. 2, has, at any given moment in time, a momentary angle "A" in the scanning plane from the operational target to a vertical plane through the longitudinal centerline of the vehicle. At that point in time there is also a certain distance or range "R" from the laser unit to the target. The relationship is defined by the algorithm sin A = [offset (F)/range(R)] or its equivalent A = arcsin [offset (F)/range(R)]. The desired offset may be programmed into microprocessor 44, which is also supplied with the range signal 26 obtained from the laser scanner. The output signal from microprocessor 44 will be a signal representing the desired angle "A" which would be needed at the selected offset and the observed range in order for the vehicle to be on a course having the desired offset to the target at the selected moment in time. This computation may be done by solving the above equation or it may be done with a look-up table in the computer memory. The look-up table has an advantage in that its entries can be weighted to compensate for errors that may exist in the laser measurement of range as the vehicle comes close to the target. For example, if the Lasernet ® laser scanner is used, its range measurement is derived from the sweep time of the scanning beam across a target of known width. If a vehicle carrying this scanner approaches a target on a path that passes alongside the target, rather than directly at it, the apparent width of the target as seen by the scanner will be progressively foreshortened as the vehicle approaches the target. This will produce erroneous range measurements unless a correction is made, which consists of dividing the observed range measurement by the cosine of the observed angle measurement. Such a correction can be conveniently incorporated into a look-up table, thus simplifying the calculations required in the computer. If a different laser scanner were used, this correction might not be needed, and direct computation rather than a look-up table might be preferred These are software choices.

The output from microprocessor 44, a signal representing the desired angle, is connected to angle comparator 48 where it is compared with the actual angle as given by the angle signal 30 from laser scanner 12. If the two angle signals are not equal, the vehicle is not on the correct heading for the desired offset. The difference between the calculated angle signal and the observed angle signal provides an error signal to comparator 22 to bring the vehicle to the desired heading to obtain the desired offset. The output signal from angle comparator 48 is in digital form and is converted by a D/A converter 50 to an analog form for use in comparator 22. The computer program which calculates the desired angle for a particular offset and range can provide periodic sampling of the laser outputs and provide steering corrections at as frequent intervals as required.

The '402 patent describes a vertical tracker which is used to keep the laser aimed at a succession of ceiling-mounted targets as the machine moves forward and passes under them. This same vertical tracker is utilized with the present invention. The laser will receive a reflected signal from a particular target so long as that target remains in the scanning field of the laser. As the machine approaches a target, the laser will report the range and angle information on that target until it passes out of the field of view. The vertical tracker will then move the laser until the laser locks onto the next target mounted generally ahead of the machine, and the laser will then automatically start recording the range and angle information on that next target. The offset guidance system will operate as described to steer the machine on a course offset from each target in turn.

The measurement which the laser scanner makes of distance or range from the laser to a target is based on the time which is required for the scanning laser beam to sweep the width of the target. Correct range readings require all targets to be of a known uniform width, and six inches has been chosen as the standard target width. If some other target width is chosen, for example seven inches, a biased range signal will be generated. This can be used to establish a new offset, or vary the values of the predetermined offsets.

Thus, for example, a particular corridor to be swept might be equipped with 6-inch wide targets and certain offsets might be set into the machine. These offsets would be followed in that corridor. Then, in another corridor where different offsets were needed, a set of, say, 7-inch wide targets might be installed. These would change the offsets to the values required without changing the offset settings for the machine. The machine would thus be ready to operate again in the first corridor without any reprogramming.

It is pointed out that the present invention is particularly well suited for performing the region filling application required of floor maintenance machines. A plurality of targets can be arranged in a line or row above the region, typically in the center of the region, although it could be otherwise. The machine is caused to traverse the region from one end to the other in a series of passes. During each pass a particular offset is maintained as the machine guides on the targets. At the end of each pass the machine is turned around and the offset is changed by a computer, as described in U.S. Pat. No. 4,790,402, to cause the succeeding pass to be laterally spaced from previous passes. With overhead targets one of the passes may be made with a zero offset. This procedure is repeated until the entire region has been treated.

A further refinement of the region filling task is to place a special marker target at the end of each pass to indicate to the machine when it should turn around and begin the next pass with a different offset. These may be retroreflective targets placed on the ceiling or otherwise located above the floor area being cleaned and facing downward. Mounted on the machine and pointed vertically upward may be an infrared photoelectric sensor which can send and receive an infrared light beam, as described in U.S. Pat. No. 4,790,402. When the machine passes under one of these targets the upward pointing light beam from the sensor will be reflected back to it by the target, creating a signal to indicate that the end of a pass has been reached and that a new pass should begin. The turn may be a 180 degree turn with the next offset being altered by an amount about equal to the width of the machine. Or other region filling patterns could be used if a 180 degree turn is undesirable or the vehicle is too large to make one in the available space. Another possibility is the use of a second line of targets in a direction different from the first line.

Preferably the laser scanner will be mounted on the machine with its optical center located in the vertical plane containing the longitudinal centerline of the machine. The offset distance from a machine to a target for steering purposes will then be the same as the offset distance from the laser scanner to a target. However, it may sometimes happen that the configuration of the machine will not physically permit mounting the scanner in this location. In such a case the scanner may be located on either side of the centerline plane of the machine as required. The desired offset that is to be programmed into the computer may then be adjusted for the off-center location of the scanner. Thus, for example, if the scanner is located to the right of the machine centerline, the desired offset entered into the computer will be decreased for targets to the right of the machine and increased for targets to the left of the machine by the amount that the scanner is off the machine centerline. The resultant guidance will be the same as it would be if the scanner were on the machine centerline and the desired offset to target with no adjustments was programmed into the computer.

Whereas the preferred form of the invention has been shown and described herein, it should be realized that there may be many modifications, substitutions and alterations thereto.

I claim:

1. A method of automatically guiding a floor maintenance machine so as to treat a floor area of extended width relative to the machine width, comprising the steps of:
   placing a plurality of retroreflective targets at non-specific distances in a row relative to the floor area to be treated;
   causing the floor maintenance machine to traverse the floor area in a pass from one end of the floor area to the other;
   guiding the machine during the pass with reference to each target successively to maintain a predetermined offset distance from the row of targets; and
   successively changing the predetermined offset distance after completion of at least one pass so as to make the offset distance either more or less than the width of the machine, and;
   making additional passes at the successive offset distance until the enter floor area has been treated.

2. The method of claim 1 further including the steps of turning the machine around at the end of a pass and changing the offset distance an amount substantially equal to the width of the machine's floor treating apparatus.

3. The method of claim 1 further characterized in that there is only a single row of targets in a given direction.

4. The method of claim 1 further comprising the step of changing the predetermined offset distance from time to time during a pass so that the vehicle may move by or around a fixed obstacle in its path.

5. The method of claim 1 further including the steps of placing a marker target to define the end of a pass and sensing the arrival of the machine at a marker target.

6. The method of claim 1 further characterized in that the floor maintenance machine includes a light source thereon located in the vertical plane containing the longitudinal centerline of the machine and including the steps of:
   placing the retroreflective targets in successive locations offset a desired distance from each of the desired passes, the targets being located higher than the light source;
   traversing a light beam from said light source through a scanning plane;
   controlling the angle of elevation of the scanning plane such that the scanning plane substantially continuously intersects one of the targets to maintain a target in view;
   sensing the actual angle in the scanning plane between the vertical plane containing the longitudinal axis of the machine and a light beam from the light source to the target in view;
   sensing the range from the light source to the target in view;
   using the desired offset distance and the sensed range from the light source to the target in view to determine the desired angle in the scanning plane between the vertical plane containing the longitudinal axis of the machine and a light beam from the light source to the target in view;
   steering the machine such that the actual angle equals the desired angle; and
   repeating this procedure with each target successively during the execution of each pass until the entire floor area has been treated.

7. The method of claim 6 further characterized in that there is only a single row of targets.

8. A method for controlling an automated guided vehicle such that the vehicle travels along a desired path, comprising the steps of:
   placing a light source on the vehicle;
   placing a plurality of retroreflective targets laterally offset a desired distance from the desired path, the targets being located higher than the light source;
   traversing a light beam from the light source through a scanning plane;
   controlling the angle of elevation of the scanning plane such that the scanning plane substantially continuously intersects one of the targets to maintain a target in view;
   sensing the actual angle in the scanning plane between a reference line in the scanning plane passing through the light source parallel to or in the vertical plane containing the longitudinal centerline of the vehicle and a light beam from the light source to the target in view;
   sensing the range from the light source to the target in view;
   using the desired offset distance and the sensed range of the target in view to determine the desired angle in the scanning plane between the reference line and a light beam from the light source to the target in view;
   comparing the actual angle with the desired angle; and
   steering the machine such that, at any given time, the actual angle equals the desired angle.

9. The method of claim 8 wherein the step of placing a light source on the vehicle is characterized by locating said light source in the vertical plane of the longitudinal centerline of the vehicle.

10. A guidance system for an automated guided vehicle, comprising sensing means on the vehicle for emitting a light beam and traversing the light beam through a scanning plane, a plurality of spaced retroreflective targets arranged in successive locations and placed higher than the height of the sensing means, tracking means for controlling the angle of elevation of tho scanning plane such that the scanning plane substantially continuously intersects one of the targets to maintain a target in view, the sensing means including means for repeatedly detecting light reflected from the target in view and providing successive signals representing the changing range from the sensor to the target and the changing angle in the scanning plane between the vertical plane containing the longitudinal axis of the vehicle and a light beam from the sensor to the target in view, and means for utilizing the range and angle signals to provide a steering signal to maintain vehicle movement along a path which is a desired offset distance from each of the targets in succession.

11. The guidance system of claim 10 wherein said plurality of targets includes first targets of a first width which will cause the sensing means to provide a first signal representing the range from the sensor to the target and produce a corresponding steering signal, and at least one second target of a second width which will produce a correspondingly different range signal and cause a correspondingly different steering signal.

* * * * *